(12) United States Patent
Jacobsen

(10) Patent No.: US 12,439,867 B2
(45) Date of Patent: Oct. 14, 2025

(54) SYSTEM FOR PRODUCING A HYDROPONIC SYSTEM, AND HYDROPONIC SYSTEMS PRODUCED BY SUCH A SYSTEM

(71) Applicant: Ellepot A/S, Esbjerg N (DK)

(72) Inventor: Peter Meldgaard Jacobsen, Esbjerg V (DK)

(73) Assignee: Ellepot A/S, Esbjerg N (DK)

( * ) Notice: Subject to any disclaimer, the term of this patent is extended or adjusted under 35 U.S.C. 154(b) by 2 days.

(21) Appl. No.: 17/790,499

(22) PCT Filed: Jan. 19, 2021

(86) PCT No.: PCT/EP2021/051010
§ 371 (c)(1),
(2) Date: Jun. 30, 2022

(87) PCT Pub. No.: WO2021/148378
PCT Pub. Date: Jul. 29, 2021

(65) Prior Publication Data
US 2023/0044741 A1 Feb. 9, 2023

(30) Foreign Application Priority Data
Jan. 20, 2020 (DK) .......................... PA 2020 00066

(51) Int. Cl.
*A01G 31/02* (2006.01)
*A01G 9/029* (2018.01)
*A01G 9/08* (2006.01)

(52) U.S. Cl.
CPC .......... *A01G 31/02* (2013.01); *A01G 9/0299* (2018.02); *A01G 9/083* (2013.01)

(58) Field of Classification Search
CPC ...... A01G 31/02; A01G 9/0299; A01G 9/083; A01G 31/04; A01G 31/042
See application file for complete search history.

(56) References Cited

U.S. PATENT DOCUMENTS 2,771,709 A * 11/1956 Ritter .................... A01G 9/088
211/74
4,020,881 A * 5/1977 Nothen .................. A01G 9/081
53/239
(Continued)

FOREIGN PATENT DOCUMENTS

CN 207574189 U 7/2018
JP 2000-106776 A 4/2000
(Continued)

OTHER PUBLICATIONS

Translated document of Shimamoto (WO 2011/125965 A1). Accessed Jun. 6, 2023. Originally published Oct. 13, 2011. (Year: 2011).*
(Continued)

*Primary Examiner* — Joshua D Huson
*Assistant Examiner* — Edgar Reyes
(74) *Attorney, Agent, or Firm* — Morse, Barnes-Brown & Pendleton, P.C.; Sean D. Detweiler, Esq.

(57) ABSTRACT

In the field of hydroponic production of plants, a system is provided for line production of hydroponic systems. In addition, the hydroponic systems produced by the system for line production of hydroponic systems are also provided herein.

23 Claims, 8 Drawing Sheets

(56) References Cited

U.S. PATENT DOCUMENTS

| | | | | |
|---|---|---|---|---|
| 4,750,439 A * | 6/1988 | deGroot | ............... | A01G 9/083 111/105 |
| 5,247,761 A * | 9/1993 | Miles | ............... | A01G 9/086 111/104 |
| 5,365,693 A * | 11/1994 | Van Wingerden | ..... | A01G 9/086 47/1.01 R |
| 5,557,881 A * | 9/1996 | Bouldin | ............... | A01G 9/0299 47/1.01 R |
| 5,680,727 A * | 10/1997 | Sakaue | ............... | A01G 9/0299 47/1.01 R |
| 5,765,491 A * | 6/1998 | Brower | ............... | A01C 11/025 111/105 |
| 5,881,655 A | 3/1999 | Edmunds et al. | | |
| 6,219,966 B1 * | 4/2001 | Lapointe | ............... | A01G 31/02 47/62 C |
| 8,887,438 B2 * | 11/2014 | Visser | ............... | A01G 9/0299 47/73 |
| 9,675,014 B2 | 6/2017 | Hassle | | |
| 2005/0204620 A1 | 9/2005 | Butterfield et al. | | |
| 2006/0151902 A1 * | 7/2006 | Just | ............... | B30B 15/302 264/109 |
| 2009/0236035 A1 | 9/2009 | Wimer | | |
| 2010/0006607 A1 * | 1/2010 | Morse | ............... | A01G 9/081 222/544 |
| 2010/0242816 A1 * | 9/2010 | Mathis | ............... | A01G 22/05 111/200 |
| 2014/0115960 A1 * | 5/2014 | Kantola | ............... | A01G 31/02 47/65.5 |
| 2016/0183486 A1 * | 6/2016 | Kabakov | ............... | A01G 31/02 47/62 R |
| 2019/0216024 A1 * | 7/2019 | Tranberg | ............... | A01G 9/0299 |
| 2020/0260636 A1 * | 8/2020 | Ito | ............... | A01C 11/00 |
| 2021/0007290 A1 * | 1/2021 | Ellis | ............... | A01G 9/083 |
| 2021/0195858 A1 * | 7/2021 | Girardin | ............... | A01G 9/143 |

FOREIGN PATENT DOCUMENTS

| | | |
|---|---|---|
| RU | 2034449 C1 | 5/1995 |
| WO | WO-2005/067698 A1 | 7/2005 |
| WO | WO 2009/154829 A1 | 12/2009 |
| WO | WO 2011/125965 A1 | 10/2011 |
| WO | WO 2017/104703 A1 | 6/2017 |

OTHER PUBLICATIONS

Search Report for Denmark Application No. PA 2020 00066 dated Jun. 30, 2020.

International Search Report for International Application No. PCT/EP2021/051010 dated Apr. 8, 2021.

* cited by examiner

SYSTEM FOR PRODUCING A HYDROPONIC SYSTEM, AND HYDROPONIC SYSTEMS PRODUCED BY SUCH A SYSTEM

RELATED APPLICATIONS

This application is a national stage filing under 35 U.S.C. 371 of International Application No. PCT/EP2021/051010, filed Jan. 19, 2021, which claims priority to Denmark Application No. PA 2020 00066, filed Jan. 20, 2020. The entire teachings of said applications are incorporated by reference herein.

TECHNICAL FIELD OF THE INVENTION

The present invention relates to hydroponic production of plants.

BACKGROUND OF THE INVENTION

Hydroponics is a subbranch of hydroculture, which is a method of growing plants with a minimal amount of soil. The nutrients are supplied dissolved in water. The nutrients may be supplied by use of a Nutrient Film Technique (NFT) system. An NFT system is a recirculating hydroponic system that consists of long channels or trays through which a nutrient solution is constantly pumped, creating a nutrient film into which the roots grow. Plants are often started in plastic pots with stone wool inside and then placed in the growing channels or trays. This is very problematic, as there is a dramatic increase of plastic waste in general in the world, and stone wool needs to be collected and deposited. Furthermore, when the herbs are harvested, the plastic pots and stone wool are seldom separated from the root and growth medium, and both parts are therefore not recycled.

US2005204620 discloses a plant growth system consisting of a vertically positioned source of light, a reservoir, a pump, a volume of liquid based nutrient composition, a plurality of independent growing chambers arranged in a planar array around said one or more sources of light, each of said growing chambers comprising a container portion with a base and sides, an inflow/outflow gate accommodated in the base of said container portion, an height adjustable overflow gate accommodated within said container portion, and drainage plumbing connecting said container portion with said reservoir, and wherein each of said growing chambers accommodates one or more plant holding containers, wherein when said pump is activated, said pump transports said nutrient composition from the reservoir through the inflow/outflow gate into said growing chambers, and wherein when one of said growing chambers becomes flooded to the level of said overflow gate, said overflowing nutrient composition is returned to said reservoir via said drainage plumbing, and wherein when said pump is deactivated, said nutrient composition remaining in each growing chamber returns to the reservoir via the inflow/outflow gate.

WO2017104703 discloses an open-field hydroponic kit comprising: a plant; a plant support member that supports the plant; a coated fertilizer that is stored in a plant storage member and that supplies nutrients to the roots of the plant; and a float member that is capable of floating on a water surface and that has a plurality of openings which can detachably retain the plant storage member.

WO2005067698 discloses a hydroponic method for root vegetables, comprising: disposing an elevated stand in a house; superimposing a perforated cultivation case support panel on the top surface of the elevated stand; inserting in the holes cultivation cases with air permeability and water permeability having a sterile culture medium accommodated therein; installing a nutrient solution (liquid fertilizer) mist sprayer in an under space of the elevated stand; furnishing both side surfaces of the elevated stand with covertures for allowing the under space of the elevated stand to function as a mist spraying chamber; and fitting a bottom portion close to ground of the elevated stand with a tray for recovering any residue of mist sprayed nutrient solution and recycling the same.

DESCRIPTION OF THE INVENTION

It is an object of the present invention to provide an alternative hydroponic system to replace the environmentally unfriendly system with injection moulded plastic pots with stone wool. It is a further object of the invention to provide a system for producing such a hydroponic system.

A first aspect relates to a system for producing a hydroponic system, comprising:
- a conveyor system adapted for transporting an elongated hydroponic reservoir;
- a growth medium pot or bag distributor unit adapted for positioning growth medium pots or bags into said elongated hydroponic reservoir;
- optionally, at least one of a drilling unit and indentation unit, the drilling unit adapted for drilling a cavity in the top of a growth medium pot or bag positioned within said hydroponic reservoir, and the indentation unit adapted for indenting a cavity in the top of a growth medium pot or bag positioned within said hydroponic reservoir; and
- at least one of a seedling delivery unit and a seed delivery unit, the seedling delivery unit adapted for inserting a seedling in a plant pot or bag into a cavity of said growth medium pot or bag, and the seed delivery unit adapted for positioning or dropping a seed into a cavity of each of said growth medium pot or bags;
- wherein the conveyor system is adapted for transporting an elongated hydroponic reservoir through said growth medium pot or bag distributor unit, at least one of a drilling unit and indentation unit, and at least one of a seedling delivery unit and a seed delivery unit.

The conveyor may comprise one or more conveyors, e.g., a first conveyor positioned upstream to the growth medium pot or bag distributor unit, and a conveyor positioned downstream to the growth medium pot or bag distributor unit. The first conveyor may be a stepper conveyor, which is configured to move the hydroponic reservoir in successive distance movements, also called discrete step increments. The first conveyor may be a belt conveyor driven by an electric stepper motor to producing a torque to the pulley so by friction of the conveyor belt on the powered pulley the conveyor belt and the load is moved in a conveying direction. A stepper motor is commonly used for position control. The use of an electric stepper motor makes the transport of the hydroponic reservoir more controllable, e.g., to change the speed of conveying and move the hydroponic reservoir on the conveyor belt in successive distance movements. These successive distance movements allow the growth medium pot or bag distributor unit, drilling unit, and indentation unit enough time to perform their action at a specific location relative to the hydroponic reservoir. The growth medium pot or bag distributor unit will have time to position a growth medium pot or bag at a specific position within the hydroponic reservoir, and the drilling unit and indentation unit will have enough time to act on a positioned growth medium pot or bag.

The growth medium pot or bag distributor unit may be of any type known within the art being configured for distributing, and optionally also producing, growth medium pots or bags comprising an amount of growth medium held in a water and air permeable sheet material. Suitable types of distributor unit may be as disclosed in WO2017216146, WO2017216145, or WO19001944, hereby incorporated by reference.

In one or more embodiments, the distributor apparatus comprises a growth medium pot or bag production unit. Such a unit may be as disclosed in WO1992003914 or WO19011742, hereby incorporated by reference.

The system also comprises at least one of a drilling unit and indentation/dibbling unit. The drilling unit and the indentation unit may be present in the same system. In this situation, the system further comprises a controller configured for activating either the drilling unit or the indentation unit. The drilling unit adapted for drilling a cavity in the top of a growth medium pot or bag positioned within the hydroponic reservoir. The drilling unit may e.g., comprise a column drill and optionally means adapted for removing the by the drill removed growth medium. The indentation unit is adapted for indenting a cavity in the top of a growth medium pot or bag positioned within the hydroponic reservoir and may comprise a dibble tool.

The system also comprises at least one of a seedling delivery unit and a seed delivery unit. The seedling delivery unit and the seed delivery unit may be present in the same system. In this situation, the system further comprises a controller configured for activating either the seedling delivery unit or the seed delivery unit. The seedling delivery unit is adapted for inserting a seedling in a plant pot or bag into a cavity of said growth medium pot or bag. The seedling delivery unit may e.g., comprise a robotic arm or a distributor adapted for positioning or dropping the seedlings positioned in a plant pot or bag into the cavity of the relatively larger growth medium pot or bag positioned within the hydroponic reservoir. The seed delivery unit is adapted for positioning or dropping a seed into a cavity of each of said growth medium pot or bags, and may e.g., comprise a distributor adapted for positioning or dropping a seed into the cavity of the relatively larger growth medium pot or bag positioned within the hydroponic reservoir. Such seeding equipment is known within the art and may e.g., be a drumseeder, needleseeder, transplanter, or the like.

The produced hydroponic system comprises:
  an elongated hydroponic reservoir comprising a plurality of cavities adapted for receiving a growth medium pot or bag; and
  a plurality of growth medium pot or bags positioned within said cavities.

Preferably, the growth medium pot or bag comprises an amount of growth medium held in a water and air permeable sheet material.

By using a water and air permeable sheet material, preferably biodegradable, woven or nonwoven, there is no need for the environmentally unfriendly injection moulded plastic pots with stone wool. Rather, the water and air permeable sheet material may be recycled together with the plant roots and growth medium. The sheet material must be water and air permeable in order for the produced plant pot to be able to absorb water and dissolved nutrients. The hydroponic system may be line produced by the method according to the present invention.

The growth medium pot or bag may in one or more embodiments have a closed bottom end to avoid that growth medium will fall out of the pot or bag and into the pot or bag trays of the hydroponic system, thereby obstructing filters and pumps.

The term "biodegradable" as used herein describes the chemical dissolution of materials by bacteria or other biological means.

As used herein, the term "nonwoven sheet material" means a sheet material that has a structure of individual fibers or threads, which are interlaid, but not in an identifiable repeating manner. Nonwoven sheet materials may be formed by a variety of processes such as, for example, meltblowing processes, spunbonding processes, coforming processes, airlaying processes, wetlaying processes, and hydroentangling.

The fibers used for the water permeable sheet material are preferably biodegradable, which can be natural or synthetic fibers, e.g., cellulosic fibers, protein fibers or synthetic polymer fibers. Natural fibers can comprise pulped or shredded cellulose fibers, such as wood pulp, shredded wood, shredded paper (tissue, newsprint and the like), straw, cotton fiber, composted vegetation, fibrous sphagnum moss, peat moss, shredded stalks including shredded corn stalks and shredded pine straw (including needles, twigs, cones and small branches). Shredded vegetation is preferably dry before shredding. Protein fibers can e.g., be hair or gelatin. Biodegradable synthetic fibers can comprise reconstituted cellulose fibers, such as rayon fibers, vinyl polymer fibers, such as fibrous polyvinyl alcohol, poly lactic acid, and polyamide fibers.

The term "cellulosic fibers" as used herein describes fibers made from an organic compound derived primarily from plants such as trees.

The term "wood pulp fibers" as used herein describes a type of cellulosic fiber made from a lignocellulosic fibrous material prepared by chemically or mechanically separating cellulosic fiber from plants such as trees or cotton.

The term "regenerated/reconstituted cellulosic fibers" as used herein describes a type of cellulosic fiber made from wood pulp using a solvent fiber spinning process. The process involves dissolving wood pulp in a solvent and spinning the resultant spinning solution into fibers.

In one or more embodiments, the biodegradable and water permeable sheet material consist of spunlaced fibers without fiber binding materials. The term "spunlaced" as used herein refers to a structure of individual fibers or threads, which are physically entangled, without thermal bonding. Physical entanglement may be achieved using a water entanglement process, or alternatively, a needling process or a combination of both processes. The spunlaced fibers provide the strength to the water permeable sheet without the need for a binder, also, and very importantly for the present use, when the water permeable sheet is wet.

In order for the water permeable sheet material to be sealable, at least some of the fibers should preferably be made from, or coated with, a thermoplastic material. Alternatively, the water permeable sheet material could be coated with a hotmelt composition. Another method for sealing the sheet material tube may be to emboss or sew the sheet parts together.

In one or more embodiments, the water permeable sheet material is heat sealable.

In one or more embodiments, the water and air permeable sheet material comprises a) fibers coated with a thermoplastic material and/or b) fibers of a thermoplastic material; and wherein the sealings are made by heating.

In one or more embodiments, the sheet material is formed as a tube or cylinder covering the amount of growth medium.

In one or more embodiments, the tubular, or cylindrical sheet material is open in at least one of the ends.

In one or more embodiments, the pot or bag comprises a cavity adapted for receiving a seed or a seedling. The seedling may be a potted seedling, and hence, the pot or bag comprises a cavity adapted for receiving a plant pot or bag. Obviously, such a pot or bag is relatively smaller than the pot or bag with the cavity. The cavity may be formed by drilling or indentation. A drilled cavity is preferably suitable for receiving a seedling in a plant pot or bag. An indented cavity is preferably suitable for receiving a seed and may be formed by punching a dibble into the pot or bag, preferably into a part of the growth medium not covered by the sheet material. Hence, the pot or bag preferably comprises an open top end, when comprising a cavity adapted for receiving a seed or a seedling.

In one or more embodiments, the elongated hydroponic reservoir is a tube, pipe, or gutter. Preferably, the elongated hydroponic reservoir comprises means adapted for supporting the sides of the pot or bag. Such means may be the edges of holes formed in the upper wall of the tube, pipe, or gutter. In this situation, the pot or bag extends upwards through said holes. The length of the elongated hydroponic reservoir may vary, but is preferably at least 2 meters long, such as within the range of 2-50 meters, e.g., at least 3 meters, such as within the range of 3-45 meters, e.g., at least 4 meters, such as within the range of 4-40 meters, e.g. at least 5 meters, such as within the range of 5-35 meters, e.g. at least 6 meters, such as within the range of 6-30 meters, e.g., at least 7 meters, such as within the range of 7-25 meters, e.g. at least 8 meters, such as within the range of 8-20 meters, e.g., at least 9 meters, such as within the range of 9-15 meters, e.g., at least 10 meters.

In one or more embodiments, each of the plurality of growth medium pots or bags comprises a cavity in their top, and wherein said cavity is filled with a seedling in a plant pot or bag.

In one or more embodiments, each of the plurality of growth medium pots or bags comprises a cavity in their top, and wherein said cavity contains a seed.

A second aspect relates to a process for producing a hydroponic system comprising the steps of:
i) providing a system according to the present invention, and a hydroponic reservoir; and
ii) positioning a plurality of growth medium pots or bags within said hydroponic reservoir with said system;
wherein each of said growth medium pots or bags comprises an amount of growth medium held in a water and air permeable sheet material.

In one or more embodiments, the process further comprises the steps of:
iii) drilling or indenting a cavity in the top of said growth medium pots or bags with said system; and
iv.a) inserting a seedling in a plant pot or bag into a cavity of each of said growth medium pots or bags with said system; or
iv.b) positioning or dropping a seed into a cavity of each of said growth medium pots or bags with said system.

In one or more embodiments, the process further comprises the steps of:
iii) drilling a cavity in the top of said growth medium pots or bags with said system; and
iv) inserting a seedling in a plant pot or bag into a cavity of each of said growth medium pots or bags with said system.

In one or more embodiments, the process further comprises the steps of:
iii) indenting a cavity in the top of said growth medium pots or bags with said system; and
iv) inserting a seedling in a plant pot or bag into a cavity of each of said growth medium pots or bags with said system.

In one or more embodiments, the process further comprises the steps of:
iii) indenting a cavity in the top of said growth medium pots or bags with said system; and
iv) positioning or dropping a seed into a cavity of each of said growth medium pots or bags with said system.

In one or more embodiments, the process further comprises the steps of:
iii) drilling a cavity in the top of said growth medium pots or bags with said system; and
iv) positioning or dropping a seed into a cavity of each of said growth medium pots or bags with said system.

A third aspect relates to a hydroponic system produced by the process and system according to the present invention.

As used in the specification and the appended claims, the singular forms "a", "an", and "the" include plural referents unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

It should be noted that embodiments and features described in the context of one of the aspects of the present invention also apply to the other aspects of the invention.

DETAILED EMBODIMENTS OF THE INVENTION

Figure 1:
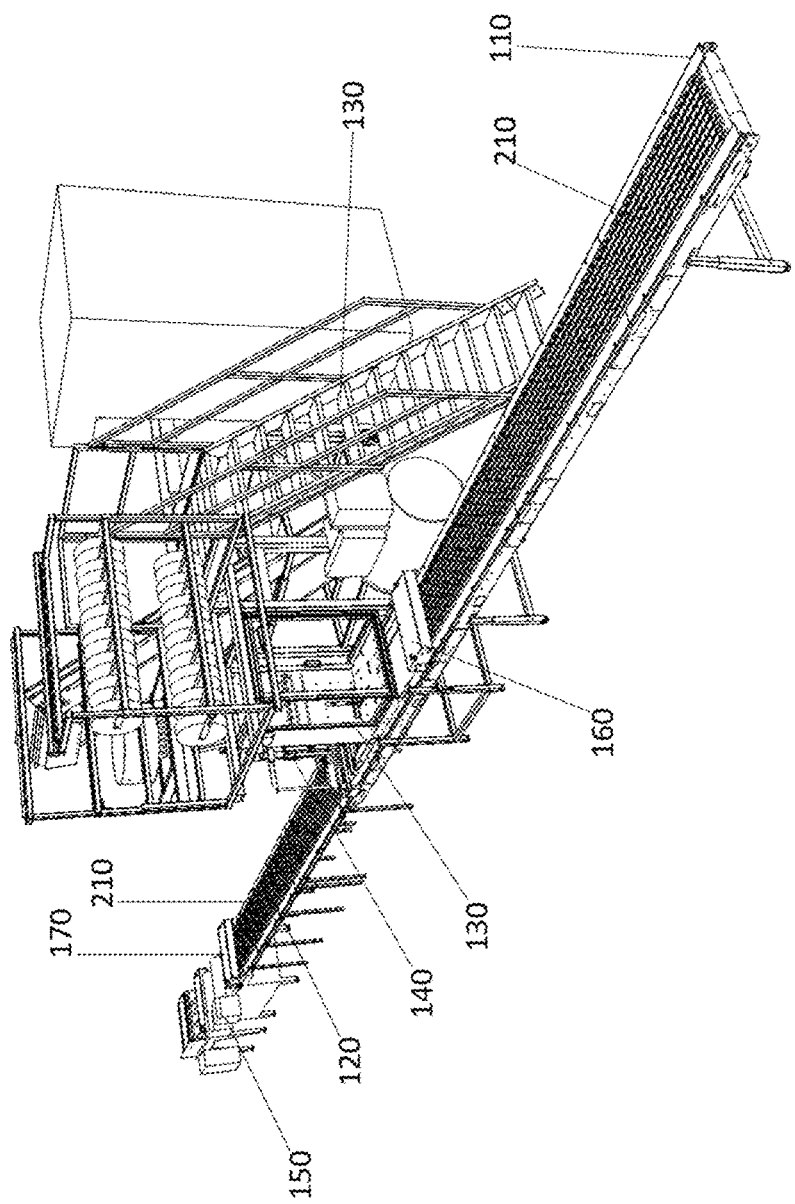
FIGS. 1-8 show different views of systems for line production of a hydroponic system according to various embodiments of the present invention.

FIGS. 1-8 show different views of systems for line production of a hydroponic system according to various embodiments of the present invention. The shown system is capable of handling nine juxtaposed hydroponic reservoirs at the time but may be used with fewer and can also be configured to handle even more. FIG. 1 shows a perspective view of the system. The system comprises a conveyor system 110, 120 adapted for transporting (juxtaposed) elongated hydroponic reservoirs 210; a growth medium pot or bag distributor unit 130 adapted for positioning growth medium pots or bags 220 (FIG. 4) into elongated hydroponic reservoirs 210; an indentation unit 140 adapted for indenting/dibbling a cavity (not shown) in the top of a growth medium pot or bag 220 positioned within said hydroponic reservoir 210; and a seed delivery unit 150 adapted for positioning or dropping a seed into a cavity of each of said growth medium pot or bags 220.

Figure 2:
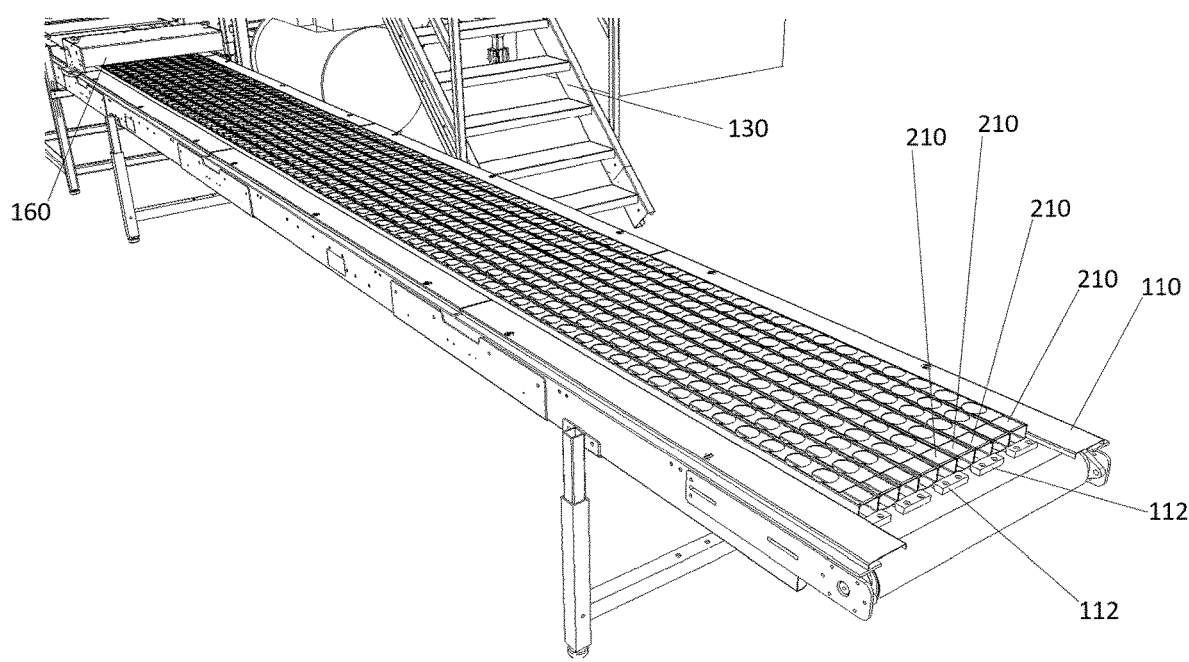

FIG. 2 shows a closeup view of the end of the system where the hydroponic reservoirs 210 are loaded. A first conveyor 110 is shown positioned upstream to the growth medium pot or bag distributor unit 130. Nine hydroponic reservoirs 210 are positioned side by side on the first conveyor 110. The hydroponic reservoirs' 210 ends are aligned by a two-part mechanism being part of the conveyor system. The first conveyor 110 comprises a belt with baffles 112 adapted for supporting the first end of the hydroponic reservoirs 210. At the end (beck end) of the first conveyor 110 closest to the growth medium pot or bag distributor unit 130, the other part of the two-part mechanism is mounted in the form of an alignment boom barrier 160 adapted for supporting the second opposing end (front end) of the hydroponic reservoirs 210.

Figure 3:
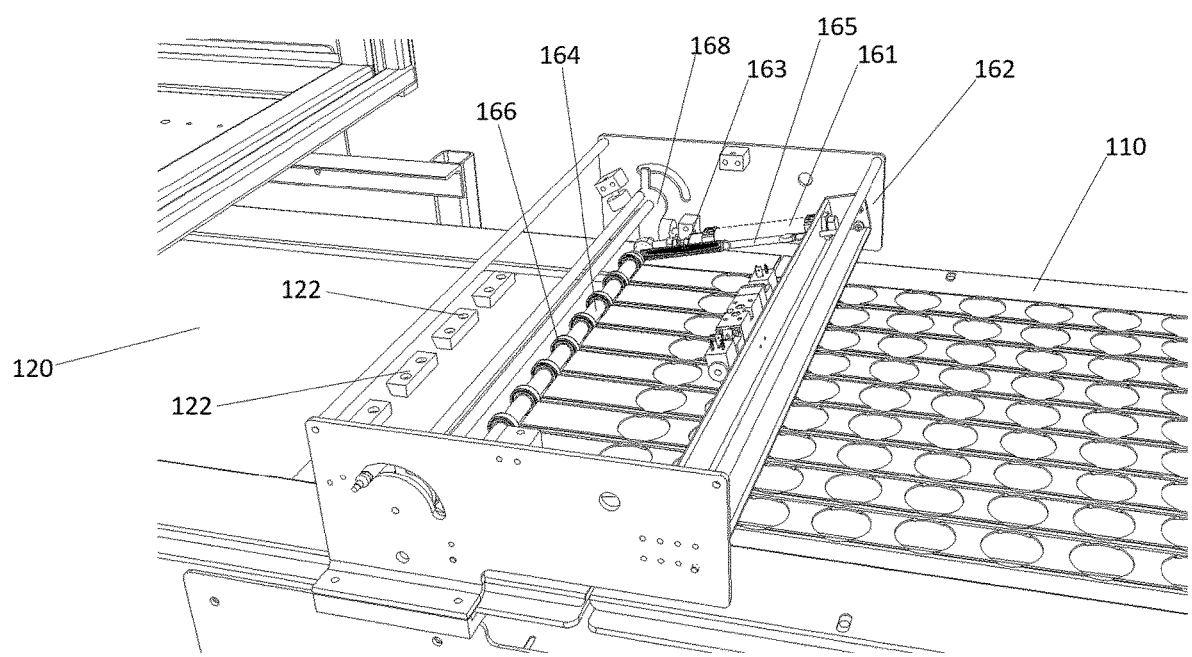

FIG. 3 shows a closeup view of the alignment boom barrier 160. A shaft 164 is pivotably attached to a chassis 162 via arms (only one is shown) 165. The shaft 164 is adapted to act as a temporary stop for the hydroponic reservoirs 210 until the baffles 112 pushes, via the belt movement, on the back end of the hydroponic reservoirs 210. Then the shaft 164 moves upwards (the arms 165 pivot) onto the top surface of the hydroponic reservoirs 210. This movement is aided by wheels 166, e.g., configured as ball bearings, thereby allowing the hydroponic reservoirs 210 to pass while the wheels 166 role on the top surface of the hydroponic reservoirs 210. In some embodiments, and also shown here, a sensor 168 is configured for sensing when the boom 164 initiates its movement towards the top of the hydroponic reservoirs 210. The arms 165 each comprise a spring 163 allowing them to vary their length. The shaft 164 is attached to a second set of arms configured as hydraulic or pneumatic piston 161. The sensor 168 then activates the hydraulic or pneumatic piston 161, thereby extending the arm length to ease the movement of the shaft 164 towards the top of the hydroponic reservoirs 210. The sensor 168 may e.g., be an inductive sensor.

Figure 4:
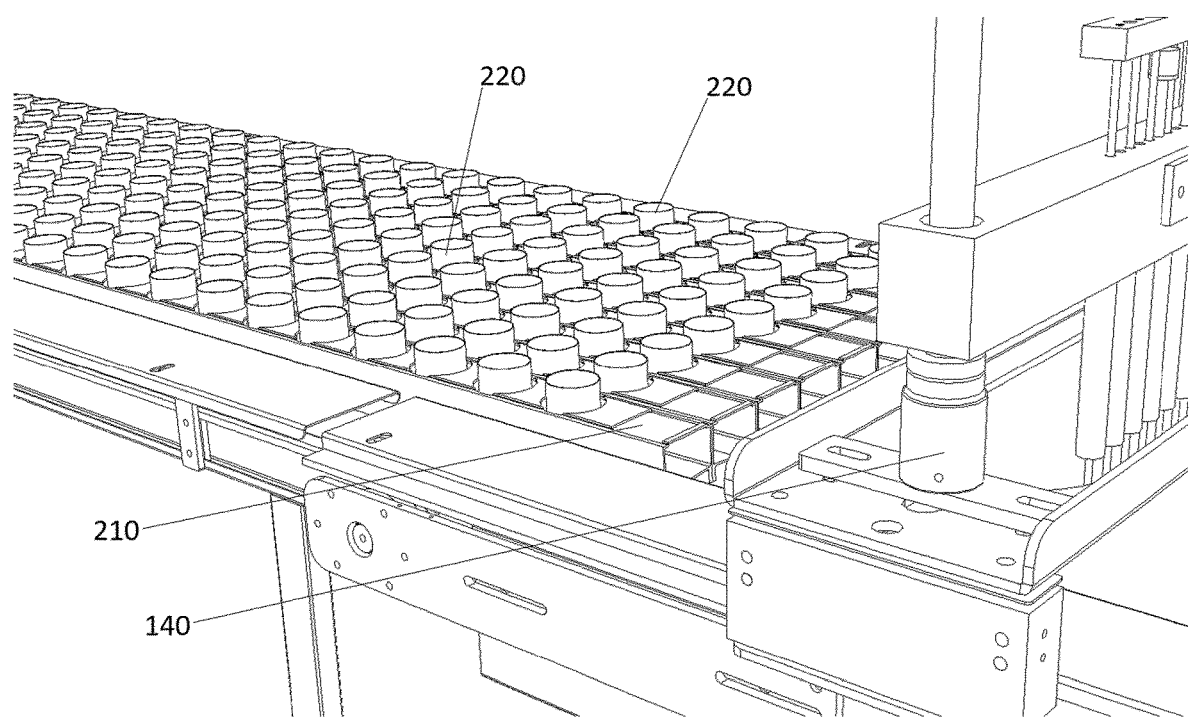
Figure 5:
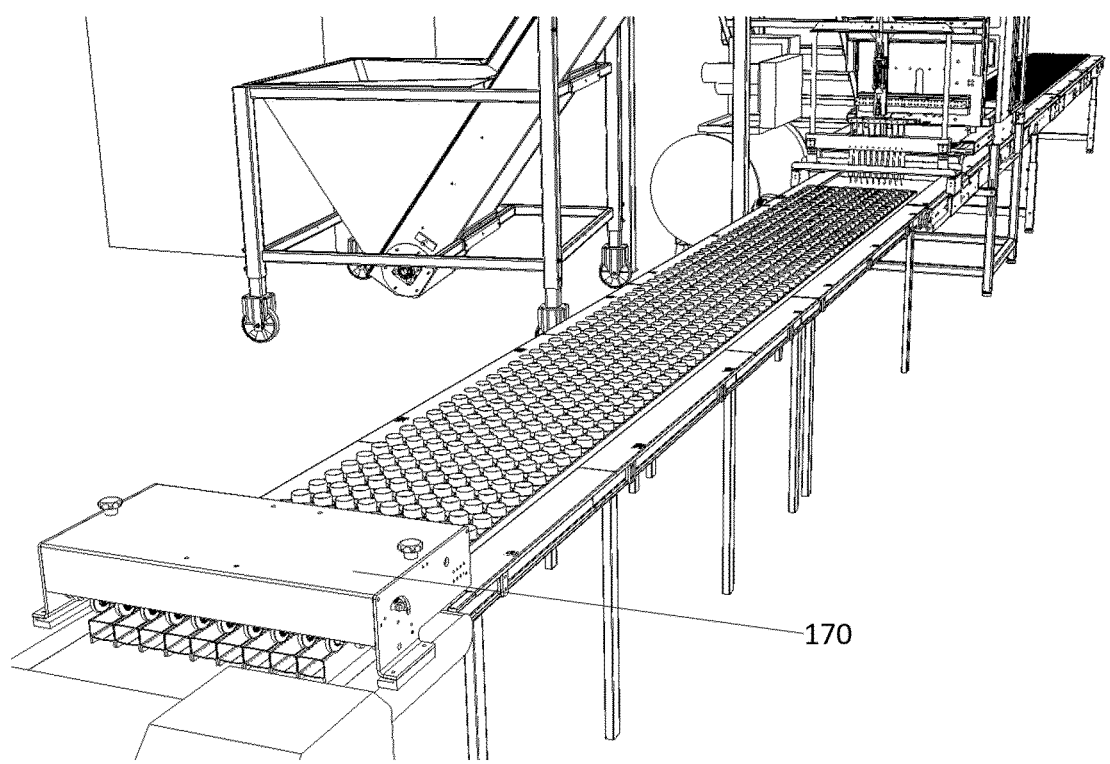

FIG. 4 shows a closeup view of the system at the location of the indentation unit 140. A hydroponic system has just been produced and is forwarded to the seed delivery unit 150 (FIG. 1) adapted for positioning or dropping a seed into a cavity of each of said growth medium pot or bags 220. Similarly, to the mechanism aligning the hydroponic reservoirs 210 before loading the growth medium pot or bags 220 therein, the hydroponic reservoirs' 210 ends may also be aligned by a two-part mechanism being part of the conveyor system. The second conveyor 120 comprises a belt with baffles 122 (FIG. 3) adapted for supporting the first end of the hydroponic reservoirs 210. At the end (beck end) of the second conveyor 120 closest to the seed delivery unit 150, the other part of the two-part mechanism is mounted in the form of an alignment boom barrier 170 adapted for supporting the second opposing end (front end) of the hydroponic reservoirs 210 (FIG. 5). The alignment boom barrier 170 may be constructed identically to the other alignment boom barrier 160. Alternatively, if the second conveyor 120 is provided with a belt without baffles 122, a different mechanism may substitute the alignment boom barrier 170. This mechanism will simply provide a pressure on top of the hydroponic reservoirs, such that friction between the belt under the seed delivery unit and said hydroponic reservoirs will be enough to forward the latter.

Figure 6:
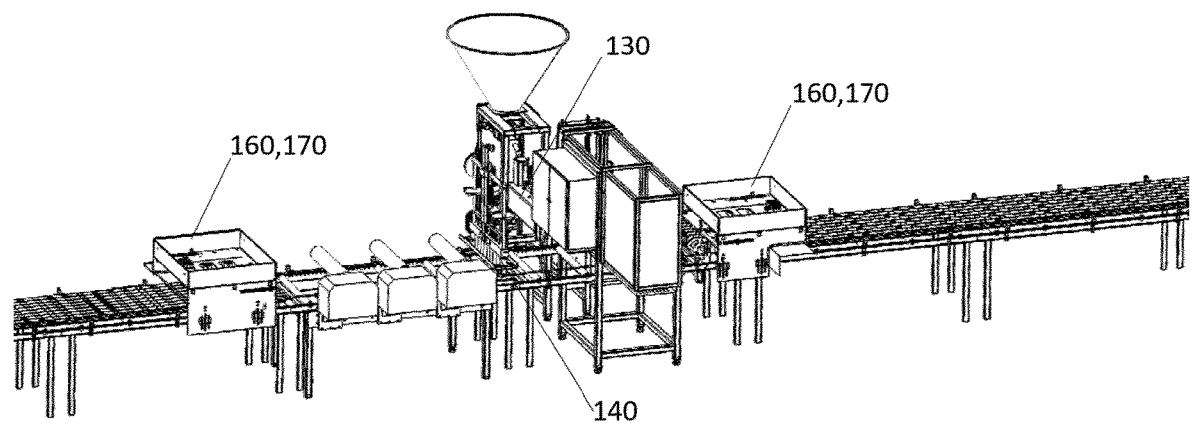

FIG. 6 shows the position of an alignment boom barrier 160,170 in relation to a distributor unit 130 and an indentation unit 140. The disclosed system is different from the one disclosed in FIG. 1 with regards to the type of alignment boom barriers and the positions thereof.

Figure 7:
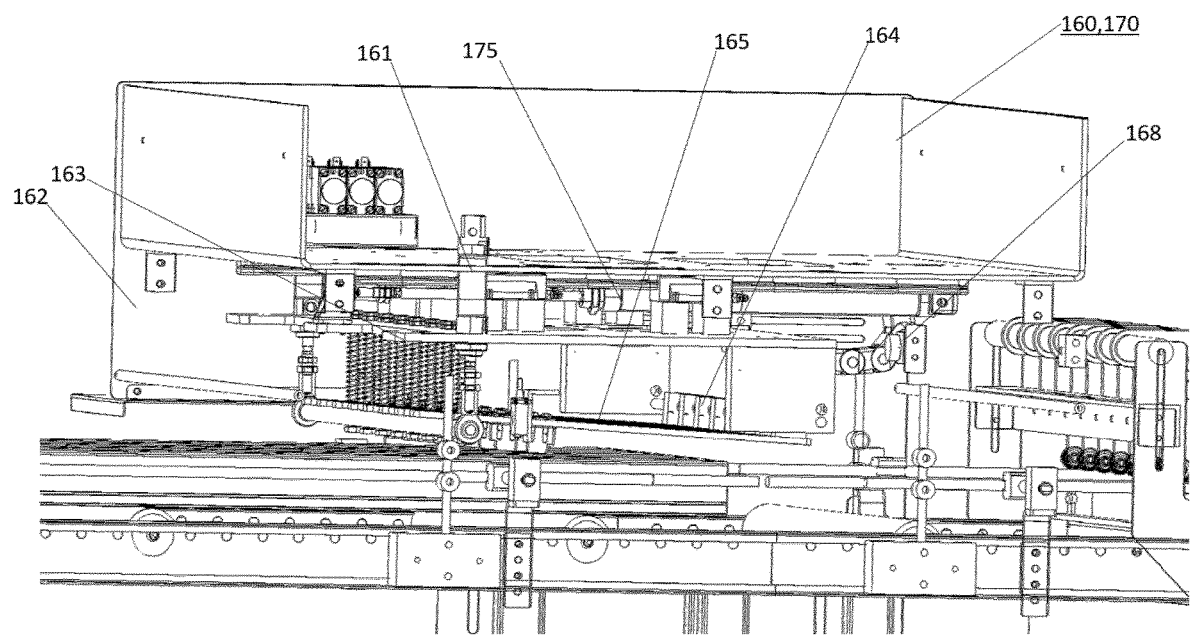
Figure 8:
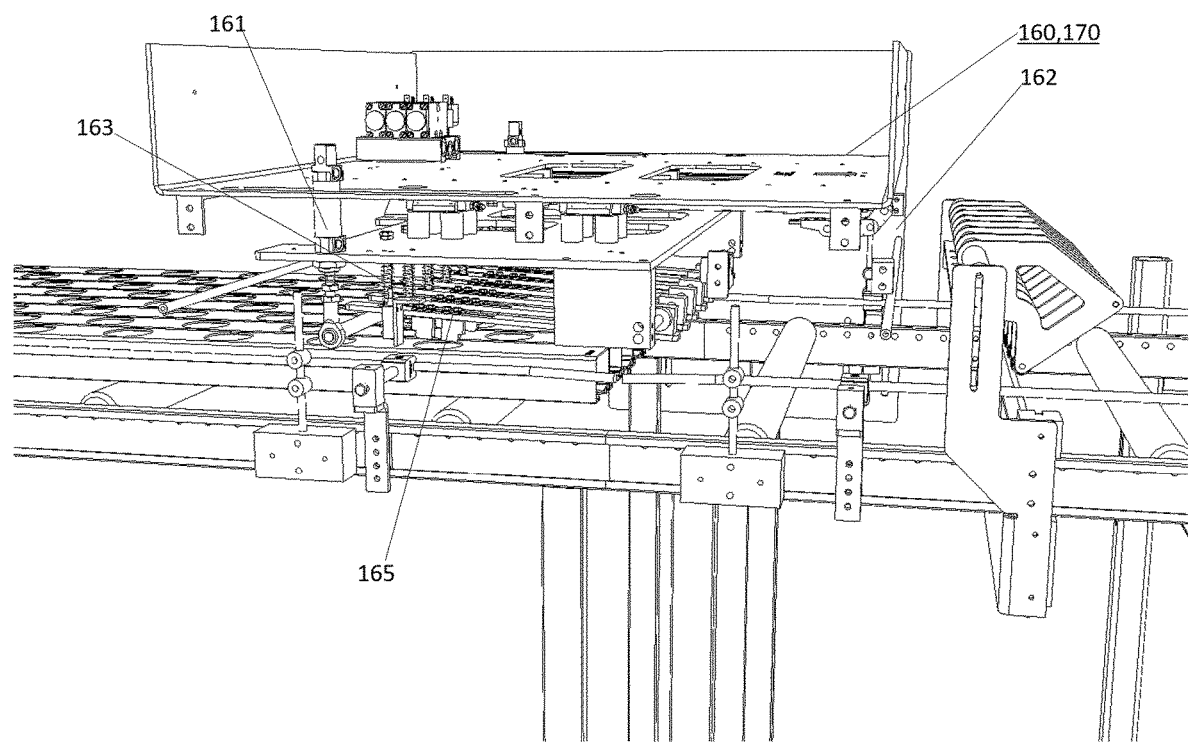

FIGS. 7 and 8 show closeup views of the alignment boom barrier 160, 170 shown in FIG. 6, where one of the cover plates is removed. The hydroponic reservoirs 210 are moving from left to right. A shaft 164 is pivotably attached to a chassis 162, and the arm 165 is attached to the shaft 164. When the arms 165 are released as the springs 163 push down thereon, the arms 165 engage with the hole in the hydroponic reservoirs 210. Now a piston 175 drags the hydroponic reservoirs 210 to a second position, and the arms 165 are then lifted by a piston 161. At this moment, the hydroponic reservoirs 210 are aligned, and the piston 161 moves the arms 165 back to their starting position.

REFERENCES

110 Conveyor
120 Conveyor
130 Distributor unit
140 Indentation unit
150 Seed delivery unit
160 Alignment boom barrier
161 Piston
162 Chassis
163 Spring
164 Shaft
165 Arm
166 Wheel
168 Sensor
170 Alignment boom barrier or pressure applicator
175 Piston
210 Hydroponic reservoir
220 Pot

The invention claimed is:

1. A system for producing a hydroponic system, said hydroponic system comprising:
   a) an elongated hydroponic reservoir (210) comprising a plurality of cavities adapted for receiving a growth medium pot or bag (220) each cavity comprising a hole formed in an upper wall of the elongated hydroponic reservoir, said hole defined by edges in said upper wall, wherein the elongated hydroponic reservoir is a tube, pipe, or gutter of at least 2 meters in length; and
   b) a plurality of growth medium pots or bags (220), each growth medium pot or bag (220) held in a water and air permeable sheet material with a tubular or cylindrical shape positioned within a separate cavity of said cavities;
   wherein the plurality of pots or bags are adapted for extending upwards through said hole in the cavity;
   wherein said edges are adapted for supporting the sides of the pot or bag;
   wherein the system comprises:
      a conveyor system (110, 120) adapted for transporting said elongated hydroponic reservoir (210);
      a growth medium pot or bag distributor unit (130) adapted for positioning the plurality of growth medium pots or bags (220) into said elongated hydroponic reservoir (210);
      at least a drilling unit and/or an indentation unit (140), the drilling unit adapted for drilling a cavity in the top of each growth medium pot or bag (220) positioned within said hydroponic reservoir (210), and the indentation unit (140) adapted for indenting a cavity in the top of each growth medium pot or bag (220) positioned within said hydroponic reservoir (210); and
      at least one of a seedling delivery unit and a seed delivery unit (150), the seedling delivery unit adapted for inserting a seedling in a plant pot or bag into a cavity of each of said plurality of growth medium pots or bags (220), and the seed delivery unit (150) adapted for positioning or dropping a seed into said cavity of each of said plurality of growth medium pots or bags (220);

a controller configured for activating said drilling unit and/or said indentation unit (140);

wherein said conveyor system (110, 120) is adapted for transporting said elongated hydroponic reservoir (210) through said growth medium pot or bag distributor unit (130), drilling unit and/or indentation unit (140), and at least one of a seedling delivery unit and a seed delivery unit (150).

2. The system according to claim 1, comprising at least one drilling unit, said drilling unit adapted for drilling a cavity in the top of a growth medium pot or bag (220) positioned within said hydroponic reservoir (210).

3. The system according to claim 1, comprising at least one drilling unit, said drilling unit adapted for drilling a cavity in the top of a growth medium pot or bag (220) positioned within said hydroponic reservoir (210), and wherein said drilling unit comprises a column drill, and, optionally, means adapted for removing the by the column drill removed growth medium.

4. The system according to claim 1, comprising at least one indentation unit (140), said indentation unit (140) adapted for indenting a cavity in the top of a growth medium pot or bag (220).

5. The system according to claim 1, comprising at least one indentation unit (140), said indentation unit (140) adapted for indenting a cavity in the top of a growth medium pot or bag (220), and wherein said indentation unit (140) comprises a dibble tool.

6. The system according to claim 1, wherein said conveyor system (110, 120) comprises a first conveyor (110) positioned upstream to said growth medium pot or bag distributor unit (130), and a second conveyor (120) positioned downstream said growth medium pot or bag distributor unit (130).

7. The system according to claim 1, wherein said conveyor system (110, 120) comprises a first conveyor (110) positioned upstream to said growth medium pot or bag distributor unit (130), and a second conveyor (120) positioned downstream said growth medium pot or bag distributor unit (130), and wherein said first conveyor (110) is a stepper conveyor, configured to move said hydroponic reservoirs (210) in successive distance movements.

8. The system according to claim 1, wherein said conveyor system (110, 120) comprises a first conveyor (110) positioned upstream to said growth medium pot or bag distributor unit (130), and a second conveyor (120) positioned downstream said growth medium pot or bag distributor unit (130), and wherein said first conveyor (110) is a belt conveyor driven by an electric stepper motor.

9. The system according to claim 1, comprising a seedling delivery unit and a seed delivery unit (150), said seedling delivery unit adapted for inserting a seedling in a plant pot or bag into a cavity of said growth medium pot or bag (220), and said seed delivery unit (150) adapted for positioning or dropping a seed into a cavity of each of said plurality of growth medium pots or bags (220); said system further comprising a controller configured for activating either said seedling delivery unit or said seed delivery unit (150).

10. A process for producing a hydroponic system, comprising the steps of:
i) providing a system according to claim 1, and a hydroponic reservoir (210); and ii) positioning a plurality of growth medium pots or bags within said hydroponic reservoir (210) with said system according to claim 1;

wherein each of said growth medium pots or bags comprises an amount of growth medium held in a water and air permeable sheet material.

11. The process according to claim 10, said process further comprising the steps of:
iii) drilling or indenting a cavity in the top of said growth medium pots or bags with said system according to claim 1; and
iv.a) inserting a seedling in a plant pot or bag into a cavity of each of said growth medium pots or bags with said system according to claim 1; or
iv.b) positioning or dropping a seed into a cavity of each of said growth medium pots or bags with said system according to claim 1.

12. The process according to claim 10, said process further comprising the steps of:
iii) drilling a cavity in the top of said growth medium pots or bags with said system according to claim 1; and
iv) inserting a seedling in a plant pot or bag into a cavity of each of said growth medium pots or bags with said system according to claim 1.

13. The process according to claim 10, said process further comprising the steps of:
iii) indenting a cavity in the top of said growth medium pots or bags with said system according to claim 1; and
iv) inserting a seedling in a plant pot or bag into a cavity of each of said growth medium pots or bags with said system according to claim 1.

14. The process according to claim 10, said process further comprising the steps of:
iii) indenting a cavity in the top of said growth medium pots or bags with said system according to claim 1; and
iv) positioning or dropping a seed into a cavity of each of said growth medium pots or bags with said system according to claim 1.

15. The process according to claim 10, said process further comprising the steps of:
iii) drilling a cavity in the top of said growth medium pots or bags with said system according to claim 1; and
iv) positioning or dropping a seed into a cavity of each of said growth medium pots or bags with said system according to claim 1.

16. A hydroponic system produced by the process according to claim 10.

17. The system according to claim 1, wherein the elongated hydroponic reservoir comprises a tube, pipe, or gutter between 2-50 meters in length.

18. The system according to claim 17, wherein the elongated hydroponic reservoir comprises a tube, pipe, or gutter between 4-40 meters in length.

19. The system according to claim 18, wherein the elongated hydroponic reservoir comprises a tube, pipe, or gutter between 6-30 meters in length.

20. The system according to claim 19, wherein the elongated hydroponic reservoir comprises a tube, pipe, or gutter between 8-20 meters in length.

21. The system according to claim 20, wherein the elongated hydroponic reservoir comprises a tube, pipe, or gutter 10 meters in length.

22. The system according to claim 1, wherein said hydroponic system comprises a plurality of juxtaposed elongated hydroponic reservoirs (210); and wherein the system comprises:

a conveyor system (110, 120) adapted for transporting said plurality of juxtaposed elongated hydroponic reservoirs (210) together through the hydroponic system;

a growth medium pot or bag distributor unit (130) adapted for positioning a growth medium pot or bag (220) into a cavity of each of the elongated hydroponic reservoirs (210) of said plurality of juxtaposed elongated hydroponic reservoirs (210) transported together through the hydroponic system;

at least a drilling unit and/or an indentation unit (140), the drilling unit adapted for drilling a cavity in the top of each growth medium pot or bag (220) positioned within the cavity of each of the elongated hydroponic reservoirs (210) of said plurality of juxtaposed elongated hydroponic reservoirs (210) transported together through the hydroponic system, and the indentation unit (140) adapted for indenting a cavity in the top of each growth medium pot or bag (220) positioned within the cavity of each of the elongated hydroponic reservoirs (210) of said plurality of juxtaposed elongated hydroponic reservoirs (210) transported together through the hydroponic system; and at least one of a seedling delivery unit and a seed delivery unit (150), the seedling delivery unit adapted for inserting a seedling in a plant pot or bag into the cavity of each of said plurality of growth medium pots or bags (220) positioned within each of the elongated hydroponic reservoirs (210) of said plurality of juxtaposed elongated hydroponic reservoirs (210) transported together through the hydroponic system, and the seed delivery unit (150) adapted for positioning or dropping a seed into said cavity of each of said plurality of growth medium pots or bags (220) positioned within each of the elongated hydroponic reservoirs (210) of said plurality of juxtaposed elongated hydroponic reservoirs (210) transported together through the hydroponic system;

a controller configured for activating said drilling unit and/or said indentation unit (140);

wherein said conveyor system (110, 120) is adapted for transporting said plurality of juxtaposed elongated hydroponic reservoirs (210) (210) together through said growth medium pot or bag distributor unit (130), drilling unit and/or indentation unit (140), and at least one of a seedling delivery unit and a seed delivery unit (150).

23. The system of claim 22, wherein the plurality of juxtaposed elongated hydroponic reservoirs (210) comprises 9 juxtaposed elongated hydroponic reservoirs (210).

* * * * *